June 12, 1934.

J. LEDWINKA 1,962,449

WINDSHIELD FRAME CONSTRUCTION

Filed Feb. 6, 1930

INVENTOR.
JOSEPH LEDWINKA.
BY
John P. Farbox
ATTORNEY.

Patented June 12, 1934

1,962,449

UNITED STATES PATENT OFFICE 1,962,449

WINDSHIELD FRAME CONSTRUCTION

Joseph Ledwinka, Philadelphia, Pa., assignor to Edward G. Budd Manufacturing Company, Philadelphia, Pa., a corporation of Pennsylvania Application February 6, 1930, Serial No. 426,203

4 Claims. (Cl. 296—84)

My invention relates to a windshield frame construction, and particularly to a construction of such frames in sheet metal and adapted to receive a vertically sliding window.

It is an object of my invention to provide a windshield frame construction of this type which requires fewer parts and parts which can be readily formed out of unitary sheet metal stampings.

According to my invention the upper and lower windshield headers are unitary stampings serving functions additional to their ordinary function of connecting the posts on the opposite sides of the body, and the side frame members are formed to provide a great strength to support the roof and a neat finish both on the inside and outside of the body.

Figure 1:
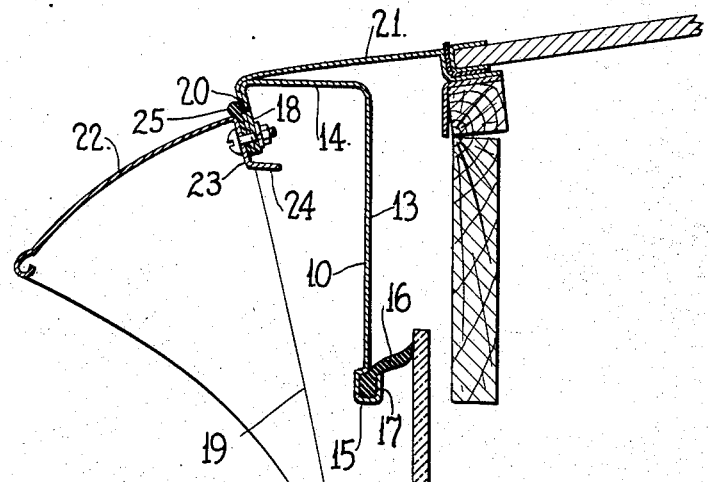

Other and further objects and advantages will appear from the following detailed description when read in connection with the appended drawing, in which Fig. 1 is a view in central vertical longitudinal section through a windshield frame according to my invention.

Figure 2:
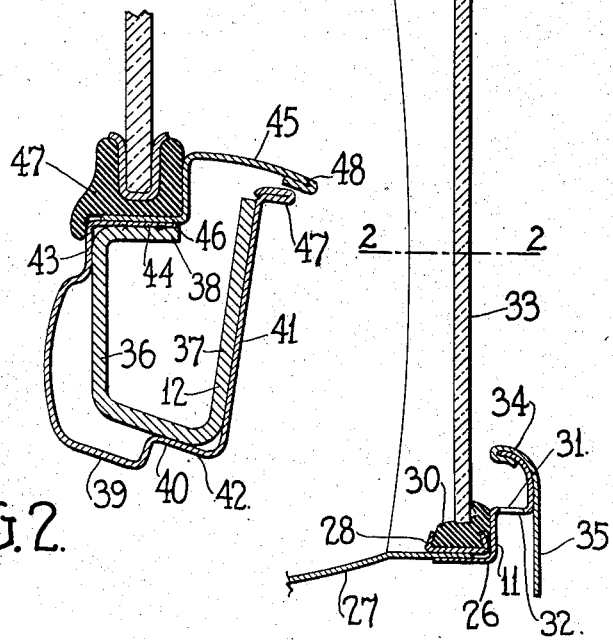

Fig. 2 is a horizontal transverse sectional view through the front post portion of the frame approximately on the line 2—2 of Fig. 1.

The windshield frame of my invention comprises an upper header stamping 10, a lower header stamping 11 and side post stampings 12 suitably joined together at their ends to form a rectangular frame.

The upper windshield header 10 combines a number of functions in one element, in addition to its usual function of connecting the tops of the posts 12. It consists in the main of a vertically extending portion 13 and a horizontally extending portion 14. The vertically extending portion is reversely bent at its lower edge to form a channel 15, within which the edge of the weather strip 16 is secured, by inserting the strip in the channel and then bending down the extreme edge 17 upon the strip to secure it in place. The reverse bending of the edge also serves to form a finish at the top of the window.

The forwardly extended portion 14 is formed with a downwardly extending flange 18 which is rearwardly inclined in conformity with the line 19 of the front post portions.

This flange 18 serves to form a connection for the forward correspondingly flanged edge 20 of the roof panel 21, which overlaps it and is secured thereto as by spot welding. This double flange 20, 18 forms a secure anchorage for a visor stamping 22 having a downwardly extending flange 23 at its rear edge terminating below the flanges 20, 18 in a rearwardly inclined finish and edge stiffening flange 24. The visor is bolted through its flange 23 to the double flange 20, 18 and a flexible weatherstrip 25 may be secured between it and these flanges to make the joint weatherproof and also to avoid squeaks.

The lower header stamping 11 is formed in its forward portion with an angular seat 26 facing forwardly and upwardly. Upon this seat is secured the rear edge of the cowl panel 27 and a channel 28 in which the rubber weatherstrip 30 is secured. A narrow horizontally-extending portion 31 rearwardly of the angle seat is formed with ventilator openings 32 at intervals to permit air to pass downwardly into the cowl, when the windshield 33 is raised.

Rearwardly of the openings 32 the stamping 11 is extended upwardly and forwardly to form a deflector 34 directing the air through the openings. This deflector portion serves to support the top edge of an instrument board or instrument board support stamping 35 which is secured thereto by crimping its edge over the edge of the deflector portion 34, thereby providing a finished and reinforced edge.

The main elements of the sides of the windshield frame are the inwardly-presenting channel-section posts 12. The front wall 36 of the post stampings is of less depth than the rear wall 37, which is of substantially the depth of the body wall, and is formed with a rearwardly directed flange 38 at the bottom of the glass run.

A cover panel 39 is formed to provide the contour lines of the post and the rabbet 40 to receive the edge of the door, and has its rear marginal portion 41, 42 form an angular portion nesting with the angular portion of the post formed by its rear and bottom walls and secured thereto. At its other edge the panel 39 is formed with an outwardly and rearwardly facing angular portion 43, 44 nesting with the angular portion 36, 38 of the post and secured thereto by spot welding flange 44 to flange 38. This cover panel strongly reinforces the main post stamping.

The trim strip 45 is secured to the inner side of the post in any suitable manner and has its forward portion formed into a forwardly and inwardly facing angular portion 46 seated against the double flange 44, 38 and, if desired, secured thereto. The windshield guiding channel 47 is seated and secured in said angle 46.

Both the rear edge of the cover panel 39 and the rear edge of the trim strip 45 are reversely bent, as shown, respectively, at 47 and 48, these reverse bent portions forming a finish and reinforce for the edges of the panels, and in the case of the reversely bent edge 47 of the cover panel extending at substantially right angles to the part 41 of the panel forming the jamb of the post. The reversely-bent edges 47 and 48, as shown, almost touch each other, and they serve to secure between them a windbreak (not shown).

What I claim is:

1. In a windshield frame for vertically slidable windshields, a top header stamping forming a vertically-extending portion forming the forward wall of the recess for receiving the upper edge of a windshield having a channel formation at its lower edge to secure a weatherstrip, and extended forwardly at its upper portion and secured to the roof at its forward edge.

2. In a vehicle construction for vertically slidable windshields, a top windshield header stamping having a vertically-extending portion forming the forward wall of a recess for receiving the upper edge of a windshield and a forwardly-extending portion flanged at its forward edge, and a roof panel flanged at its forward edge to overlap the flange of said header and secured thereto, said flanges forming a means for securing a visor.

3. In a windshield frame, a front post stamping of channel section presenting inwardly, and having its forward wall formed with a rearwardly extending flange, and a paneling covering said post and having angular edge portions nesting respectively with the angles formed, respectively, by the outer and rear side walls of said post and the front wall and its rearwardly extending flange.

4. In a windshield frame, a front post stamping having its forward edge formed to provide an outwardly and rearwardly presenting angle, a cover panel having one edge nested with said angular portion of the post, and a trim strip formed with a forwardly facing angular seat to receive the edge of the windshield secured against the rearwardly extended portions of the overlapped post and cover panel.

JOSEPH LEDWINKA.